United States Patent

[11] 3,624,599

| [72] | Inventor | Haines C. Hibbard<br>Houston, Tex. |
|---|---|---|
| [21] | Appl. No. | 881,781 |
| [22] | Filed | Dec. 3, 1969 |
| [45] | Patented | Nov. 30, 1971 |
| [73] | Assignee | Esso Production Research Company |

[54] APPARATUS FOR SWITCHING GEOPHONES
4 Claims, 6 Drawing Figs.

[52] U.S. Cl. .................................................. 340/15.5 TS,
307/293, 340/15.5 MC, 340/15.5 TC
[51] Int. Cl. .................................................. G01v 1/22,
G01v 1/24
[50] Field of Search .......................................... 340/15.5

[56] References Cited
UNITED STATES PATENTS
2,260,217 10/1941 Eckhardt et al. ............. 340/15.5

Primary Examiner—Richard A. Farley
Assistant Examiner—Daniel C. Kaufman
Attorneys—James A. Reilly, John B. Davidson, Lewis H. Eatherton, James E. Gilchrist, Robert L. Graham and James E. Reed ABSTRACT: Apparatus for switching a seismic recorder from an areal array of geophones to a direct arrival seismic wave detector, controlled a radio signal at the recorder location which is transmitted to the geophone location to control the apparatus. The array of geophones is normally connected to a conductor line leading to the recorder. When the radio signal is detected, the direct arrival detector is connected to the line. Either detection of direct arrivals or passage of a given time interval from detection of the radio signal operates to reconnect the areal array to the line.

HAINES C. HIBBARD INVENTOR.

INVENTOR.
HAINES C. HIBBARD

BY John B Davidson

ATTORNEY

INVENTOR.
HAINES C. HIBBARD

BY John B. Davidson
ATTORNEY

APPARATUS FOR SWITCHING GEOPHONES

BACKGROUND OF THE INVENTION

This invention relates to apparatus for use in connection with seismic prospecting, for faithfully recording the amplitude of first arrivals at a seismic wave detecting station while retaining the advantages of using a multiplicity of geophones at the seismic wave detecting station to achieve noise cancellation.

In seismic prospecting, as it is most commonly practiced, a central recording mechanism is connected to a multiplicity of seismic wave detecting means by means of a cable, to record electrical signals produced by the detecting means as a result of seismic waves impinging thereon. The detecting stations normally extend in substantially a straight line in opposite directions from a location at which a seismic wave disturbance is produced. At land locations, the seismic wave disturbance is most often produced by exploding a dynamite charge in a shot hole extending to below the weathered layer of the earth. The seismic energy produced by the disturbance travels outwardly in all directions. Some of the energy is refracted, reflected, or diffracted by the various layers of the earth before being detected at the detection locations. Other of the energy travels directly from the location of the seismic wave disturbance to the detecting locations to produce what are termed "first arrivals." In addition to the seismic waves produced by the disturbances, the detectors at the detecting location detect all other seismic waves in the earth such as those produced by the wind, by passing vehicles, and by general ground unrest. Inasmuch as it is usually desired to identify reflected seismic waves on seismograms produced by each seismic disturbance, it is desirable to maximize what is usually called the signal-to-noise ratio, the signal being events produced by the reflected seismic waves and the noise being events produced by all other seismic waves.

One common practice that has been found very effective is maximizing the signal-to-noise ratio has been to use a multiplicity of geophones at each seismic wave location, and to combine their signals to produce a single electrical signal which is then recorded. Since the geophones at each location, or patch, are really distributed over the earth, reflected seismic energy which arise substantially vertically at the detection location tend to add together, while other seismic waves tend to cancel each other. In recent years it has been not unusual to use 40 to 70 geophones at each detecting location.

As mentioned above, the "first arrivals" at each location travel more or less directly from the seismic disturbance location. While this "first arrival" energy is not indicative of the depth of any subsurface reflecting strata, nonetheless it contains valuable information and analysis thereof is desirable, if not vital, to the general technique of seismic prospecting. Unfortunately, when the "first arrival" energy is detected by the plurality of geophones, it tends to be cancelled out inasmuch as it does not arrive at the detecting location in a more or less vertical direction. It is possible to use a single geophone to detect "first arrivals" and to record the output signal of the geophone separately from the signal produced by all of the other geophones, but obviously this would be wasteful of recording equipment and further would require at least one extra electrical conductor extending from each detecting location to the location of the recording equipment.

Various techniques and apparatuses have been used to switch a recording mechanism from a geophone or geophones used to detect "first arrivals" to the geophones used to detect reflection seismic waves. For example, the instant of switching at a given location has been effected a given time interval after initiation of a seismic disturbance. While this technique may be satisfactory in certain locations, at other locations it may be entirely unsatisfactory. For example, should the seismic wave velocity in the weathered layer of the earth be variable, or be not known at all, the instant of switching may be too early in which case the "first arrivals" will not be recorded, or it may be quite late, in which case reflection seismic information may not be satisfactorily recorded by the array.

SUMMARY OF THE INVENTION

In accordance with one aspect of the present invention the "first arrival" geophone or geophones at a given seismic wave detecting location are connected to a recorder upon initiation of the seismic disturbance. As soon as the "first arrivals" have been detected the reflection geophones are connected to the recorder. In the event that the "first arrivals" are not satisfactorily detected the reflection geophones are connected to the recorder a predetermined time interval after initiation of the disturbance. Initiation of the seismic wave disturbance is transmitted to the detecting location from the location of the recorder by producing a modulated radio signal on the electrical conductors interconnecting the detecting location and the recording location, which radio frequency signals preferably are of a frequency less than 200 kilocycles. The radio frequency signals are detected to produce a signal for switching the recorder into circuit relationship with the "first arrival" geophones. A timing integrator is activated which will be effective, after a predetermined time internal after initiation of the seismic disturbance, to switch the recorder into circuit relationship with the reflection geophones. However, when the output signal of the "first arrival" geophones is of a predetermined amplitude a sharp electrical signal will be produced which will be effective to instantly time out the timing circuit to switch the recorder into circuit relationship with the reflection geophones.

Objects and features of the invention not apparent from the above discussion will become evident upon consideration of the following detailed description of the invention taken in connection with the accompanying drawings, which description is to be taken by way of example and not in a limiting sense.

DESCRIPTION OF THE PREFERRED EMBODIMENT

Figure 1:
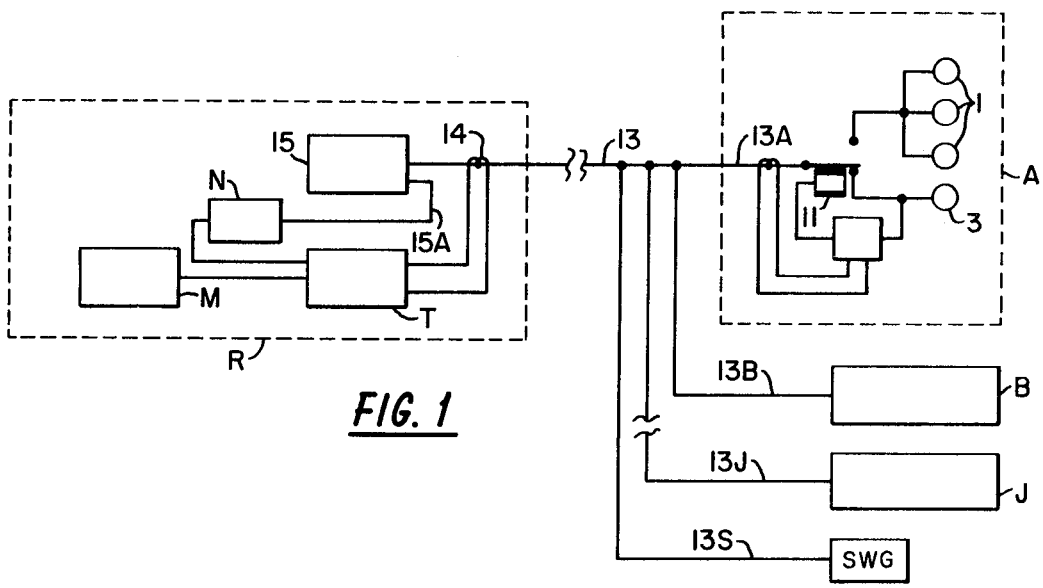
FIG. 1 is a schematic diagram of a detecting and recording system of the invention.

With reference now to FIG. 1, there is illustrated apparatus in accordance with the invention for controlling the initiation of seismic waves, for detecting the resulting seismic waves, and for recording the detected seismic waves. It is customary in seismic wave prospecting to have a multiplicity of detection stations spaced apart along a traverse and to have a seismic generating station also positioned on the same traverse. The recording location usually is at a distance from the detection stations and from the seismic wave generating station and is coupled thereto either by a cable or by a radio link. It is customary to use from 12 to 48 detection locations to detect the seismic waves resulting from each seismic disturbance produced along the traverse. The detection locations may be moved as desired to most effectively carry out each seismic observation. In FIG. 1 the blocks A, B, and J are used to designate three seismic wave detecting locations although it is to be understood that many more locations will ordinarily be used. A seismic wave generator SWG is also designated in FIG. 1. The detection locations and the seismic wave generator are not illustrated as being along a traverse or having any given relative position with respect to each other inasmuch as such is well known in the art and forms no part of the present invention. The reference designation R is used to designate a recording location at which is located a conventional seismic recorder 15, which may be either an analog recorder such as Texas Instruments Model No. T18000, or a digital recorder, such as Texas Instruments Model No. DFS–3. Also located at recording location R is a radio transmitter T which may be any radio transmitter capable of being modulated by an audio frequency signal applied thereto, and an audio frequency generator M at a given frequency, preferably about 2,000 kc. The length of time over which the radio frequency generator M is activated is determined by a timer N which is adapted to produce an electrical control signal for a predetermined period of time. The timer N may be a one-shot multivibrator or an electromechanical device, such is well known in the art, for producing an output signal of predetermined duration responsive to an activating signal applied thereto. The timer N is activated by an electrical signal on line 15, which signal is produced by the recorder 15 at the beginning of a recording cycle thereof and may be the signal ordinarily used to activate the seismic wave generator SWG. The output signal of transmitter T is electromagnetically coupled to coil 14 to a cable 13 extending from the recorder 15 to the various seismic wave detection locations A, B . . . . . J and to the seismic wave generator SWG. The cable 13 carries a multiplicity of conductors 13A, 13B . . . . 13J for conducting electrical signals from the detecting locations to the recorder for recordation purposes, and an electrical line 13S for connection to the seismic wave generator SWG to control the activation thereof. Such is well known to the art and will not be further discussed.

The radio frequency signal produced by the transmitter T is preferably below 200 kilocycles so as to minimize radiation from the cable 13 to insure that the radio frequency signal will be transmitted from the recorder location or to the various detection stations A, B . . . . . J.

At each of the detecting locations there is located a multiplicity of reflection geophones 1, which may be from any number up to 70 or 80, and direct arrival detector means 3, which may be one or more geophones, but preferably not in excess of three geophones. When more than one geophone is used to detect "first arrivals" at a given location, such geophones should be very closely spaced. In FIG. 1 only three reflection geophones are illustrated and only one direct arrival detection geophone is illustrated, and then only at station A, to avoid unnecessarily cluttering the drawings. It is to be understood that similar apparatus will be located at each of the other detecting locations. The geophones 1 are connected in parallel so that the signals in effect are summed together to produce one composite signal. A relay 11 connects the line 13A either to the reflection geophones 1 or to the direct arrival detecting geophone 3. A relay control circuit RC, which will be described hereinafter in greater detail, is connected to the first arrival geophone 3 and to the relay 11, and is also electromagnetically coupled to the line 13A. Circuit RC functions to switch the relay 11 so that it connects line 13A to geophone 3 at the beginning of a recording cycle and, at an appropriate time thereafter, activates relay 11 so as to connect line 13A back into circuit relationship with the geophones 1. As indicated above, similar apparatus is provided at each of the other detection stations B . . . . J.

Figure 2:
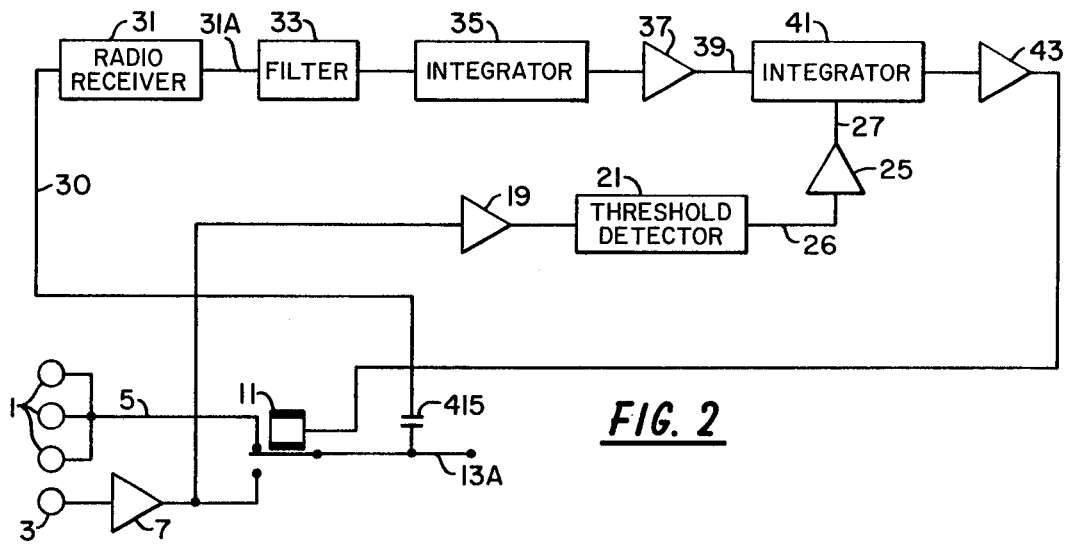
FIG. 2 is a schematic diagram illustrating in greater detail the elements A, B, and C in FIG. 1.
Figure 3:
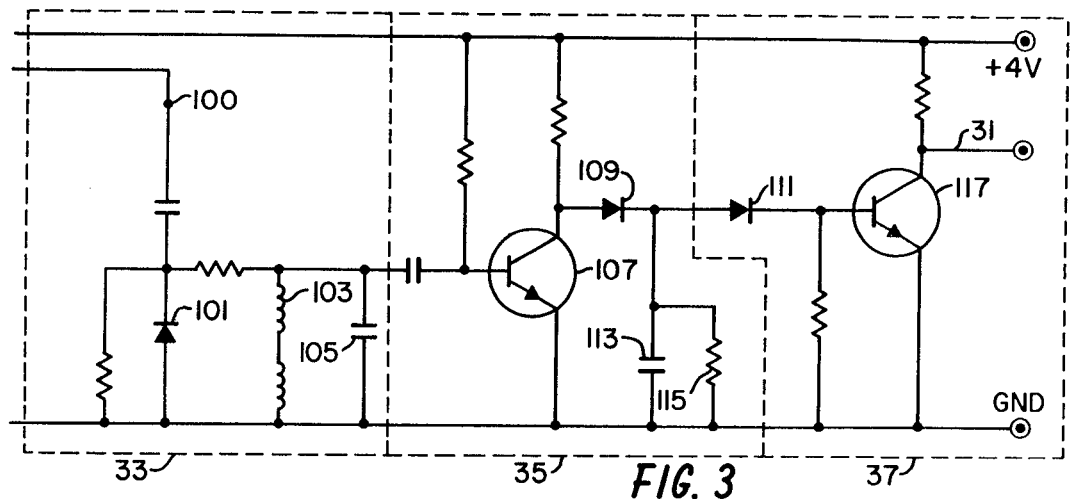
FIG. 3 is a schematic electrical circuit diagram showing the circuit details of filter 33, integrator 35, and amplifier 37 of FIG. 2.

Refer now to FIG. 2 wherein there is illustrated a more complete schematic circuit diagram of the apparatus included within the boxes A, B . . . . J in FIG. 1. Here again there are illustrated the three reflection geophones 1 and the direct arrival detecting geophone 3. The line 13A is again illustrated as being connected to either the direct arrival geophone 3 or to the reflection geophones 5 by means of the contacts of relay 11. The relay 11 and the electrical lines are illustrated very schematically in FIG. 2 for purposes of illustration and will be illustrated in greater detail particularly with respect to FIG. 6. A radio receiver 31 which may be of conventional design and should be capable of detecting radio signals in the range below 200 kilocycles and demodulating the radio signal to produce an appropriate audio frequency output signal indicative of the audio signal used to modulate radio signals detected by the receiver, is coupled to line 13A by means of a line 30 and a capacitor means 415. In lieu of capacitor 415, a coil wrapped around the line 13A may be used. Alternatively, capacitive coupling may be used to connect radio frequency signals from line 13A to the input of radio receiver 31. Such techniques are well known to the art.

The output signal of radio receiver 31 will comprise only the audio signal used to modulate any radio frequency signals applied to the input thereof. The audio frequency signals are applied to a filter 33, the function of which is to convert the substantially sinusoidal audio frequency signal into a square wave signal having the same repetition rate as the frequency of the audio frequency signal applied thereto. The output signal from filter 33 is a pulse train having all pulses of the same amplitude. These pulses are applied to an integrator 35, the function of which is to produce an elongated pulse having the same duration as the pulse train applied to the input thereof. The signal from integrator 35 is applied to an isolating amplifier 37 the output signal on line 39 of which is applied to an integrator 41 which functions as a timing circuit. The integrator 41, which may be a Miller integrator of conventional design, charges to an output voltage of given amplitude responsive to the pulse from integrator 35 applied thereto. After the termination of the pulse, the output voltage decays at a determinable rate to produce an output signal through isolating amplifier 43. The output signal of the amplifier 43 functions to switch relay 11 from the position illustrated, at which geophones 1 are connected to line 13A, to the other position thereof at which geophone 3 is connected to line 13A (through isolating amplifier 7) as soon as an output voltage is produced by the integrator 41 responsive to an output signal from receiver 31 and integrator 35. When the output voltage of the integrator has decayed to a given voltage, the relay 11 is activated again to connect geophones 1 to line 13A.

Geophone 3 also is connected to the input of an amplifier 19 through amplifier 7. The output of amplifier 19 is connected to threshold detector 21. The function of the threshold detector is to produce an output signal when the input signal thereto is of a determinable amplitude so as to effectively short circuit the output voltage of integrator 41. In other words, the output signal from threshold detector 21 will terminate the decay cycle of the integrator 41 responsive to input signals of determinable amplitude applied to detector 21 so as to immediately switch the relay back to the position at which geophones 1 are connected to the line 13A. The overall operation of the apparatus described with respect to FIGS. 1 and 2 is as follows. At the beginning of a seismic observation, the recorder 15 is activated. Concomitantly, the signal will appear on line 15A and on line 13S. The signal appearing on line 13S (transmitted thereto through cable 13) activates the seismic wave generator SWG to produce a seismic pulse. Previously the transmitter 13 has been activated so as to produce an unmodulated radio frequency output signal. The signal appearing on line 15A functions to activate the audio frequency generator M so that a modulated output signal is coupled to line 13 from transmitter T. This signal is transmitted along line 13 and will concomitantly appear at the input of the blocks A, B . . . . J on line 13A, 13B . . . . 13J. The radio frequency signals appearing on line 13A, for example, will be coupled to the radio receiver 31 and, as described above, will function to immediately switch relay 7 so that geophone 3 is connected to line 13A. The output signal of geophone 3 will be transmitted on line 13A to the recorder 15 and will be recorded thereby. As soon as the first arrivals seismic waves impinge upon geophone 3, a high amplitude output signal will be produced thereby which will activate the threshold detector 21 to short circuit the output voltage of integrator 41 and bring it effectively to zero. This will cause the relay 11 to switch to the normal position thereof illustrated in FIG. 2 so that the output signals thereafter produced by geophones 1 will be connected to line 13A and transmitted to recorder 15 for recordation thereof.

If for some reason geophone 3 should not produce sufficiently large amplitude output signal to activate threshold detector 21, the integrator 41 will time out and, at the end of the timing interval, will switch the relay 11 so that geophones 1 are connected to line 13A. The timing interval is selected so that such switching will occur before seismic wave reflections from reflectors of predetermined depth will be detected by the geophones 1 so that reflection information will not be lost. Thus, an automatic failsafe is provided in the circuit in the event the first arrival signals are not sufficiently strong to activate threshold detector 21, or in the event of failure of any of the circuit components in the amplifiers 7, 19, and 21.

With reference now to FIG. 2, there is illustrated an electrical circuit diagram for the filter 33, integrator 35, and amplifier 37. The filter 33 essentially comprises a tuned circuit including capacitor 105 and inductor 103 which is responsive to a pulse applied thereto to produce a sharp output pulse of predetermined amplitude. The pulse is derived from the output signal of the radio receiver 31 appearing at terminal 100, which is rectified by rectifier 101 before being applied to the tuned circuit 103, 105. The output pulses from the filer are coupled to an amplifier including transistor 107 and the amplified pulses are applied through diode 109 to an integrator comprising capacitor 113 and resistor 115 which are connected in parallel. The train of output pulses from amplifier 107 is in effect converted into a single pulse of slightly longer duration than the duration of the pulse train. This pulse is coupled to an isolating amplifier including transistor 117 through diode 111. The transistor amplifier 117 also inverts the amplitude of the pulse signal applied thereto so that a signal of appropriate amplitude can be applied to the Miller integrator 41 which is illustrated in FIG. 5.

Figure 4:
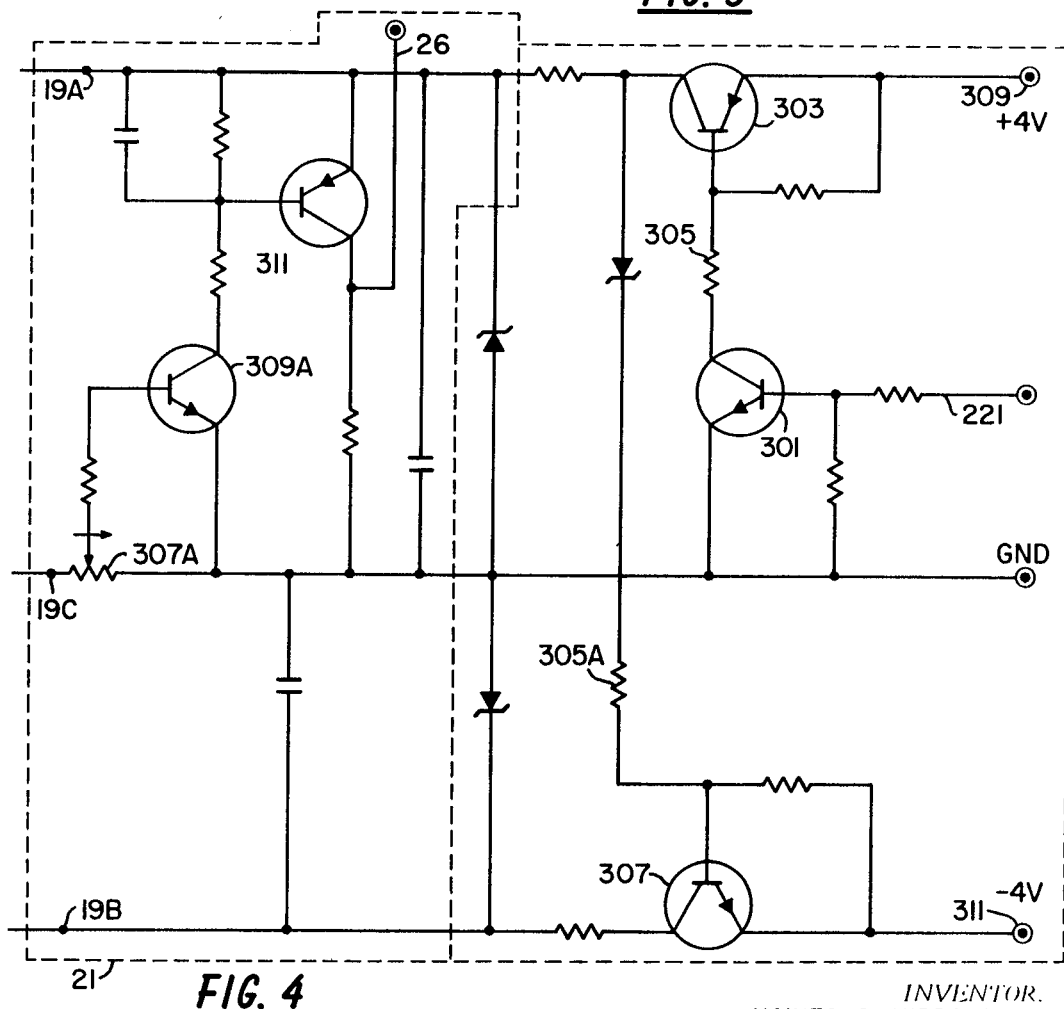
FIG. 4 is an electrical circuit diagram showing the circuit details of threshold detector 21 of FIG. 2.
Figure 5:
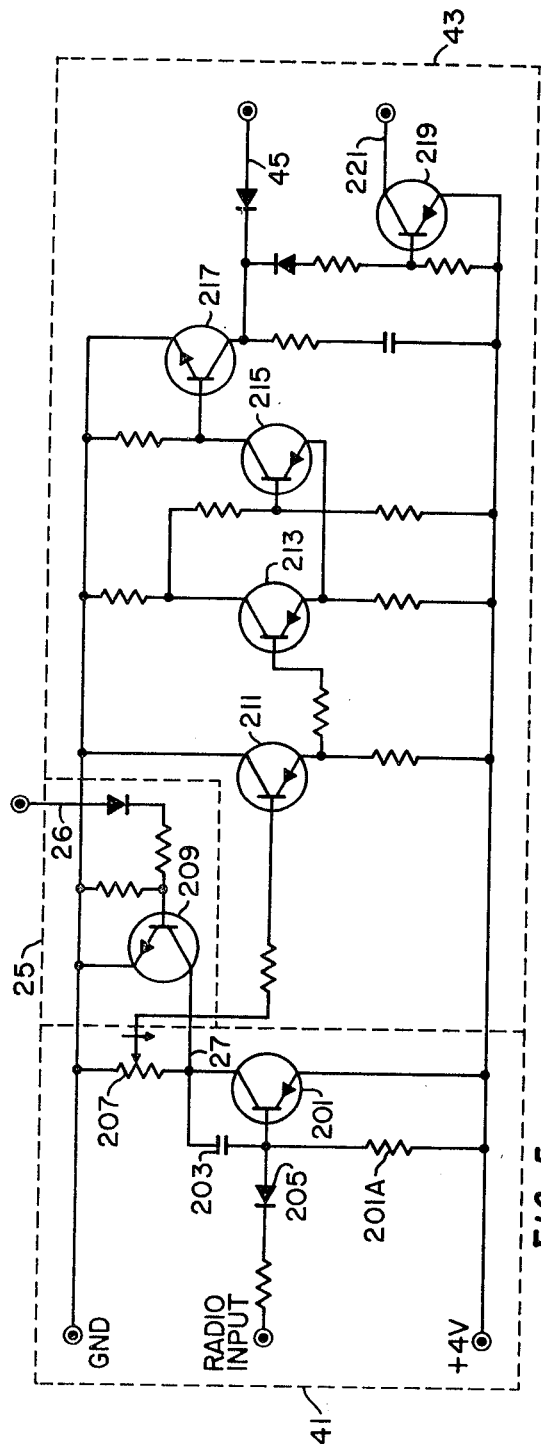
FIG. 5 is an electrical circuit diagram showing the circuit details of integrator 41 and amplifier 43 of FIG. 2.

Referring now to FIG. 5, the output signal from transistor amplifier 117 is coupled by means of diode 205 to a conventional Miller integrator including transistor 201, resistor 201A, integrating capacitor 203, and a potentiometer 207 which functions to control the decay rate of the voltage across capacitor 203. The tap of the potentiometer 207 is coupled through a resistor to the base of a transistor 211. Transistors 211, 213, 215, and 217 function as amplifiers to drive a relay control amplifier illustrated in FIG. 6. The output signal from transistor 217 is concomitantly applied to line 45 for transmission to the relay control amplifier and to a transistor amplifier 219 which provides a signal for selectively connecting amplifier 19 and threshold detector 21 to their power supply. This has the effect of conserving electrical power to the maximum extent possible, an important consideration in this particular application. Transistor 209, which is connected between the collector electrode of transistor 201 and ground, acts as a transistor switch and is responsive to a pulse signal on line 26 to short circuit the resistor 207 to effectively connect the collector electrode transistor 201 to ground. In effect, the timing circuit provided by the Miller integrator 41 is immediately timed out when a signal appears on line 26. With references now to FIG. 4, there is illustrated the circuit details of the threshold detector 21 and the power control circuit therefor. The power applied to circuit 21 may also apply power for amplifier 19 which may be connected to terminals 19A and 19B. The output signal from the amplifier is applied to terminal 19C. A potentiometer 307 is connected between terminal 19C and ground. The tap of the potentiometer is connected to the base electrode of transistor 309A. Transistors 309 and 311 are connected as conventional amplifiers. The voltage at which amplifier 301 will respond is controlled by the potentiometer 307A. Therefore, low amplitude signals applied from the amplifier 19 to terminal 19C will produce no output signal on line 26. Only a signal of predetermined amplitude, which may be reasonably high, will produce such an output signal on line 26 for the purpose of activating the switch 209 (see FIG. 5). Power for the amplifier 19 and the threshold detector 21 is derived from a source connected to terminals 309 and 311. Switching transistors 303 and 307 function to respectively connect terminals 309 and 311 to the threshold detector 21 and the amplifier 19. A signal applied on line 221 is connected to the base of transistor 301 so as to cause transistor 301 to conduct. This in turn will cause the switching transistor 303 to conduct so that terminal 309 is connected to amplifier 19 and detector 21. This signal is coupled through diode 305 and resistor 305A to the base of transistor 307, which causes transistor 307 to conduct so that terminal 311 is connected to the threshold detector 21 and amplifier 19. When the signal on line 221 disappears transistor 303 and 307 will be rendered nonconducting so that power is removed from amplifier 19 and detector 21.

Figure 6:
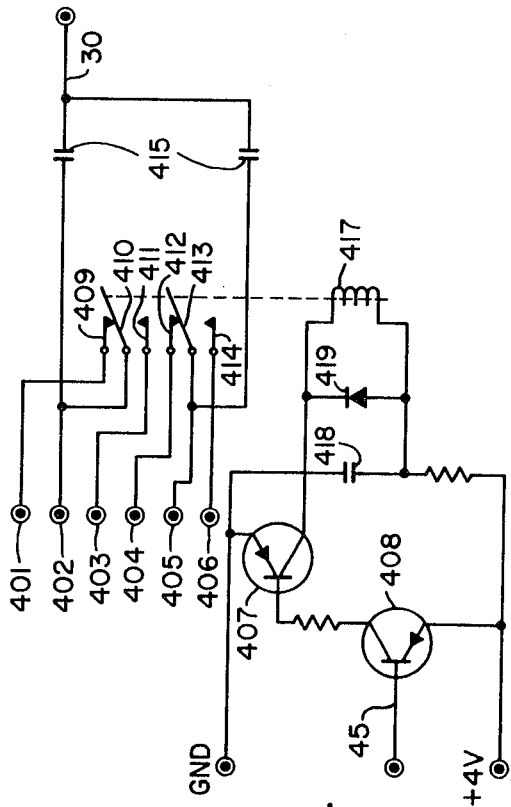
FIG. 6 is an electrical circuit diagram showing the details of the switching mechanism 11 and the amplifier therefor illustrated in FIG. 2.

The details of the relay driver amplifier and the relay contact circuitry is illustrated in FIG. 6. The relay 11 is provided with a coil 417 and has two movable contacts 410 and 413 and four stationary contacts 409, 411, 412, and 414. Contacts 410 and 413 are respectively connected to line terminals 402 and 405 which are connected the conductors of line 13. Terminals 409 and 412 are respectively connected to output terminals 401 and 404 which are respectively connected to the conductors leading to the geophones 1. Terminals 411 and 414 are connected to output terminals 403 and 406 to the conductors leading to geophone 3. The terminals 402 and 405 may also be connected through 300 micromicrofarad capacitors 415 to line 30 leading to radio receiver 31.

The energizing coil 417 of relay 11 is coupled to the output of a transistor amplifier comprising transistors 407 and 408, and has a diode 419 and capacitor 418 in parallel therewith. The output signal from transistor 217 (see FIG. 5) is applied to the base of transistor 408 for activation of the transistor amplifier to energize relay winding 417 and activate the relay.

The control circuitry described above is advantageous in that it provides a simple, low power, very effective circuit for controllably switching first arrival geophones to a recorder and thereafter switching reflection geophones to the recorder. The circuitry may be controlled from a remote location simply by modulating a low power radio frequency transmitter at the remote location, without the necessity for direct electrical connection thereto. Any number of geophone stations may be controlled from the remote recording location. If for some reason it is not desired to switch to a reflection geophone at the beginning of a recording interval, this can be accomplished simply by not modulating the radio frequency transmitter. Thus, complete flexibility of operation is insured.

What is claimed is

1. Apparatus for connecting reflection seismic wave detection means and first arrival seismic wave detection means to a recorder responsive to a control signal indicative of the production of seismic waves, comprising: switch means for connection to said reflection seismic wave detection means, for normally connecting said reflection detection means to said recorder; first circuit means responsive to said control signal for activating said switch means to disconnect said reflection seismic wave detection means from said recorder and to connect said first detection means to said recorder;

said first circuit means including timing circuit means for deactivating said switch means to reconnect said reflection detection means to said recorder and disconnect said first arrival seismic wave detection means from said recorder after a predetermined time interval; and second circuit means connected to said timing circuit means and to said first arrival detection means to immediately time out said timing circuit and foreshorten said predetermined time interval responsive to the production by said first arrival detection means of signals of predetermined amplitude.

2. Apparatus for connecting reflection seismic wave detection means and first arrival seismic wave detection means to a recorder responsive to a control signal indicative of the production of seismic waves, comprising:

switch means for connection to said reflection seismic wave detection means, for normally connecting said reflection detection means to said recorder;

first circuit means responsive to said control signal for activating said switch means to disconnect said reflection seismic wave detection means from said recorder and to connect said first detection means to said recorder;

said first circuit means including timing circuit means for deactivating said switch means to reconnect said reflection detection means to said recorder and disconnect said first arrival seismic wave detection means from said recorder after a predetermined time interval;

second circuit means connected to said timing circuit means and to said first arrival detection means to immediately time out said timing circuit and foreshorten said predetermined time interval responsive to the production by said first arrival detection means of signals of predetermined amplitude;

said first circuit means comprising detecting and pulse forming means for detecting said control signal and for producing an electrical pulse signal for application to said timing circuit to activate said timing circuit; and said timing circuit comprising an integrator circuit including a capacitor, adapted to charge said capacitor responsive to said pulse signal and to discharge said capacitor as a time function to determine said predetermined interval.

3. The apparatus of claim 2 wherein said second circuit means includes third circuit means connected to said integrator circuit responsive to a trigger signal to quickly discharge said capacitor, and fourth circuit means responsive to signals of predetermined amplitude from said first arrival detection means to produce said trigger signal.

4. An apparatus for recording seismic wave first arrivals at a seismic wave detecting station and seismic wave reflections from subsurface reflecting horizons, including separate reflection detecting means and first arrival detecting means, recording means for recording electrical signals at a remote location from said first and second detecting means, a signal transmission link for transmitting detected seismic signals to said recording means, and circuit switching means for controllably connecting said signal transmission link to said first arrival detecting means or to said reflection detecting means, the improvement comprising:

first circuit means connected to said transmission link for producing a control signal for transmission over said link to the location of said circuit switching means;

second circuit means connected to said first arrival detecting means, to said switching means and to said signal transmission link for detecting said control signal, and responsive to said control signal to activate said circuit switching means to connect said first arrival detecting means to said transmission link, and responsive to detection of first arrivals by said first arrival detecting means to activate said circuit switching means to switch said transmission link to said reflection detecting means, said circuit switching means being further adapted to switch said transmission link to said reflection detecting means after a predetermined time interval should no first arrivals be detected thereby;

said second circuit means comprising relay driver circuit means for normally activating said switching means to connect said signal transmission means to said reflection detecting means, and responsive to an activating signal applied hereto to connect said first arrival detection means to said transmission means;

control circuit means connected to said transmission link and to said reflection detecting circuit means to apply an activating signal to said relay driver circuit means responsive to reception of said control signal from said first circuit means, and to remove said activating signal from said relay driver circuit means a predetermined time interval after reception of said control signal from said first circuit means; and means connected to said first arrival detection means and to said control circuit means for removing said activating signal from said relay driver circuit means responsive to detection of first arrival by said first arrival detection means.

* * * * *